United States Patent
Zuk et al.

(10) Patent No.: US 7,746,862 B1
(45) Date of Patent: Jun. 29, 2010

(54) PACKET PROCESSING IN A MULTIPLE PROCESSOR SYSTEM

(75) Inventors: Nir Zuk, Palo Alto, CA (US); Yu Ming Mao, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 702 days.

(21) Appl. No.: 11/338,732

(22) Filed: Jan. 25, 2006
(Under 37 CFR 1.47)

Related U.S. Application Data

(60) Provisional application No. 60/704,432, filed on Aug. 2, 2005.

(51) Int. Cl.
*H04L 12/28* (2006.01)
(52) U.S. Cl. .................................. 370/392; 370/401
(58) Field of Classification Search ................. 370/389, 370/392, 394, 400, 401, 474
See application file for complete search history.

(56) References Cited

U.S. PATENT DOCUMENTS

| | | | | |
|---|---|---|---|---|
| 5,598,410 | A | 1/1997 | Stone | 370/469 |
| 5,606,668 | A | 2/1997 | Shwed | 395/200.11 |
| 5,835,726 | A | 11/1998 | Shwed et al. | 395/200.59 |
| 6,006,264 | A | 12/1999 | Colby et al. | 709/226 |
| 6,119,236 | A | 9/2000 | Shipley | 713/207 |
| 6,253,321 | B1 | 6/2001 | Nikander et al. | 713/160 |
| 6,275,942 | B1 | 8/2001 | Bernhard et al. | 713/201 |
| 6,279,113 | B1 | 8/2001 | Vaidya | 713/201 |
| 6,301,668 | B1 | 10/2001 | Gleichauf et al. | 713/201 |
| 6,304,975 | B1 | 10/2001 | Shipley | 713/201 |
| 6,311,278 | B1 | 10/2001 | Raanan et al. | 713/201 |
| 6,321,338 | B1 | 11/2001 | Porras et al. | 713/201 |
| 6,370,603 | B1 * | 4/2002 | Silverman et al. | 710/72 |
| 6,421,730 | B1 * | 7/2002 | Narad et al. | 709/236 |
| 6,449,647 | B1 | 9/2002 | Colby et al. | 709/226 |
| 6,453,345 | B2 | 9/2002 | Tracka et al. | 709/224 |
| 6,466,985 | B1 | 10/2002 | Goyal et al. | 709/238 |
| 6,487,666 | B1 | 11/2002 | Shanklin et al. | 713/201 |
| 6,499,107 | B1 | 12/2002 | Gleichauf et al. | 713/201 |
| 6,600,744 | B1 * | 7/2003 | Carr et al. | 370/392 |
| 6,768,738 | B1 | 7/2004 | Yazaki et al. | |
| 6,781,992 | B1 * | 8/2004 | Rana et al. | 370/394 |
| 6,788,648 | B1 | 9/2004 | Peterson | 370/252 |

(Continued)

FOREIGN PATENT DOCUMENTS

JP 2000-312225 11/2000

(Continued)

OTHER PUBLICATIONS

International Search Report for corresponding PCT application, PCT/US2004/009607, dated Oct. 22, 2004, 3 pages.

(Continued)

*Primary Examiner*—Hong Cho
(74) *Attorney, Agent, or Firm*—Harrity & Harrity, LLP

(57) ABSTRACT

Packet processing is provided in a multiple processor system including a first processor to processing a packet and to create a tag associated with the packet. The tag includes information about the processing of the packet. A second processor receives the packet subsequent to the first processor and processes the packet using the tag information.

26 Claims, 10 Drawing Sheets

U.S. PATENT DOCUMENTS

| | | | | |
|---|---|---|---|---|
| 6,851,061 | B1 | 2/2005 | Holland et al. | 713/201 |
| 6,856,991 | B1 | 2/2005 | Srivastava | 707/10 |
| 7,006,443 | B2 | 2/2006 | Storr | 370/236.1 |
| 7,139,679 | B1* | 11/2006 | McGrew | 702/186 |
| 7,376,085 | B2 | 5/2008 | Yazaki et al. | |
| 2001/0028650 | A1* | 10/2001 | Yoshizawa et al. | 370/389 |
| 2002/0032797 | A1 | 3/2002 | Xu | 709/238 |
| 2002/0080789 | A1* | 6/2002 | Henderson et al. | 370/392 |
| 2002/0124187 | A1 | 9/2002 | Lyle et al. | 713/201 |
| 2002/0126621 | A1* | 9/2002 | Johnson et al. | 370/230 |
| 2003/0105976 | A1 | 6/2003 | Copeland | 713/201 |
| 2003/0145225 | A1 | 7/2003 | Bruton, III et al. | 713/201 |
| 2003/0149888 | A1 | 8/2003 | Yadav | 713/200 |
| 2003/0154399 | A1 | 8/2003 | Zuk et al. | 713/201 |
| 2005/0141503 | A1* | 6/2005 | Welfeld | 370/392 |
| 2005/0163132 | A1* | 7/2005 | Mieno et al. | 370/395.53 |
| 2006/0005231 | A1 | 1/2006 | Zuk et al. | 713/201 |

FOREIGN PATENT DOCUMENTS

| | | |
|---|---|---|
| JP | 2003-78549 | 3/2003 |
| WO | WO 03/025766 A1 | 3/2003 |

OTHER PUBLICATIONS

Stonesoft, 'StoneBeat *Security Cluster White Paper*,' Aug. 2000, Finland, pp. 1-9.

Stonesoft, '*Secure Highly Available Enterprise-A White Paper*,' Feb. 2001, Finland, pp. 1-10.

Stonesoft, '*StoneGate White Paper*,' Mar. 2001, Finland, pp. 1-6.

Stonesoft Corp. '*StoneGate*,' product webpage, www.stonesoft.com/document/363.html, Mar. 27, 2001 (print date), pp. 1-2.

Stonesoft Corp. '*Next Level of Network Accessibility*' webpage, www.stonesoft.com/document/183.html, Mar. 27, 2001 (print date), p. 1.

Stonesoft Corp., '*Platforms*,' webpage, www.stonesoft.com/document/186.html, Mar. 27, 2001 (print date), p. 1.

Nokia, *'Technical White Paper: The IP Clustering Power of Nokia VPN-Keeping Customers Connected*,' Apr. 2001, pp. 1-13.

Nokia, '*Nokia VPN Solutions—Nokia VPN CC2500 Gateway*,' 2001, product information, pp. 1-2.

Nokia, '*Nokia VPN Solutions—Nokia VPN CC5200 Gateway*,' 2001, product information, pp. 1-2.

Nokia, '*Nokia VPN Solutions—Nokia VPN CC5205 Gateway*,' 2001; product information, pp. 1-2.

Axelsson, S., "Intrusion Detection Systems: A Survey and Taxonomy," *Dept. of Computer Eng.*, Chalmers Univ. of Technology, Goteborg, Sweden, Mar. 14, 2000, pp. 1-27.

Avolio, F., "Firewalls and Virtual Private Networks," CSI Firewall Archives, printed Nov. 13, 2001, URL: http://www.spirit.com/CSI/Papers/fw+vpns.html, pp. 1-7.

Bace, R., "An Introduction to Intrusion Detection & Assessment," ICSA Intrusion Detection Systems Consortium White Paper, 1999, URL: http://www.icsalabs.com/html/communities/ids/whitepaper/Intrusion1.pdf, pp. 1-38.

Business Wire, Inc., "NetScreen and OneSecure Unite to Deliver Industry's First Total Managed Security Services Platform," San Jose, CA, Feb. 20, 2001, pp. 1-2.

Business Wire, Inc., "OneSecure Launches the First Co-Managed Security Services Platform," Denver, CO, Jan. 29, 2001, pp. 1-2.

Carr, Jim, "Intrusion Detection Systems: Back to Front?," *Network Magazine*, Sep. 5, 2001, URL:http://www.networkmagazine.com/article/NMG20010823S0007/2, pp. 1-9.

Check Point Software Technologies Ltd., Firewall-1® Technical Overview P/N 500326, www.checkpoint.com, Oct. 2000, pp. 1-29.

Cisco Systems, "Cisco IOS Firewall Intrusion Detection System," Cisco IOS Release 12.0(5)T, 2001, pp. 1-40.

Cisco Systems, "Cisco IOS Firewall Authentication Proxy," Cisco IOS Release 12.0(5)T, 2001, pp. 1-48.

Clark, D., "RFC815-IP Datagram Reassembly Algorithms," Internet RFC/STD/FYI/BCP Archives, http://www.faqs.org/rfcs/rfc815.html, Jul. 1982, pp. 1-8.

Copeland, Dr. John A., "Observing Network Traffic-Techniques to Sort Out the Good, the Bad, and the Ugly," PowerPoint Slide Presentation presented to ISSA-Atlanta, Jun. 27, 2001, pp. 1-22.

Denning, Dorothy E., "An Intrusion-Detection Model," IEEE Transactions on Software Engineering, vol. SE-13, No. 2, Feb. 1987, 17 pages.

Farrow, Rik, "An Analysis of Current Firewall Technologies," *CSI 1997 Firewalls Matrix*, 1998, URL:http://www.spirit.com/CSI/Papers/farrowpa.htm, pp. 1-5.

Firewall Product Comparison Table: VelociRaptor, BorderWare Firewall Server and Firewall-1/VPN-1 Gateway, www.spirit.com, printed Nov. 13, 2001, pp. 1-7.

Firewall Product Comparison Table: PIX Firewall, CyberGuard Firewall for UnixWare & CyberGuard Firewall for Windows NT, www.spirit.com, printed Nov. 13, 2001, pp. 1-8.

Firewall Product Comparison Table: CyberGuard Premium Appliance Firewall, InstaGate EX & BizGuardian VPN Firewall, www.spirit.com, printed Nov. 13, 2001, pp. 1-8.

Firewall Product Comparison Table: Server Protector 100, GNAT Box Firewall Software & Lucent Managed Firewall, www.spirit.com, printed Nov. 13, 2001, pp. 1-6.

Firewall Product Comparison Table: Internet Security and Acceleration (ISA) Server 2000, NetBSD/i386 Firewall & Guardian Firewall, www.spirit.com, printed Nov. 13, 2001, pp. 1-7.

Firewall Product Comparison Table: NetScreen-10 and NetScreen-100, CyberwallPLUS & BorderManager, www.spirit.com, printed Nov. 13, 2001, pp. 1-7.

Firewall Product Comparison Table: Gauntlet Firewall, Barricade Classic/XL & Barricade S, www.spirit.com, printed Nov. 13, 2001, pp. 1-8.

Firewall Product Comparison Table: Sidewinder™ , SecurePipe Managed Firewall Service & SnapGear, www.spirit.com, printed Nov. 13, 2001, pp. 1-7.

Firewall Product Comparison Table: SonicWALL PRO, Sunscreen Secure Net & WinRoute Pro 4.1, www.spirit.com, printed Nov. 13, 2001, pp. 1-6.

Firewall Product Comparison Table: WatchGuard Technologies, Inc. LiveSecurity System 4.6, www.spirit.com, printed Nov. 13, 2001, pp. 1-4.

Graham, R., "FAQ: Network Intrusion Detection System," www.robertgraham.com/pubs/network-intrusion-detection.html, Ver. 0.8.3, Mar. 21, 2000, pp. 1-43.

Habra, N. et al., "ASAX: Software Architecture and Rule-Based Language for Universal Audit Trail Analysis," Proceedings of the ESORICS '92, European Symposium on Research in Computer Security, Nov. 23-25, 1992, Toulouse, Springer-Verlag, 16 pages.

ICSA Labs, Intrusion Detection System Buyer's Guide, ICSA White Paper, 1999, pp. 1-52.

Jackson, K. et al., "Intrusion Detection System (IDS) Product Survey," *Los Alamos National Laboratory*, Los Alamos, NM, LA-UR-99-3883 Ver. 2.1, Jun. 25, 1999, pp. 1-103.

Jones, Kyle, "Introduction to Firewalls," *IT Audit.org Forum Network Management*, vol. 2, May 1, 1999, URL:http://www.itaudit.org/forum/networkmanagement/f209nm.htm, pp. 1-5.

Lancope, "The Security Benefits of a Flow-Based Intrusion Detection System," White Paper, date unknown, pp. 1-11, Jan. 25, 2006.

LapLink, Inc., "Article #178-Introduction to Firewalls," www.laplink.com/support/kb/article.asp?ID=178, Apr. 24, 2001, pp. 1-3.

McHugh, J. et al., "Defending Yourself: The Role of Intrusion Detection Systems," *Software Engineering Institute*, IEEE Software Eng., Sep./Oct. 2000, pp. 42-51.

Network ICE Corporation, "Why Firewalls Are Not Enough," at www.networkice.com/products/firewalls.html, 2000, pp. 1-9.

Power, R., et al., "CSI Intrusion Detection System Resource-Five Vendors Answer Some No-Nonsense Questions on IDS," *Computer Security Alert #184*, Jul. 1998, pp. 1-8.

Power, R., "CSI Roundtable: Experts discuss present and future intrusion detection systems," *Computer Security Journal*, vol. XIV, #1, URL: http://www.gocsi.com/roundtable.htm, 2001, pp. 1-20.

Sample, Char, et al., "Firewall and IDS Shortcomings," SANS Network Security, Monterey, CA, Oct. 2000, pp. 1-13.

Smith, Gary, "A Brief Taxonomy of Firewalls-Great Walls of Fire," SANS Institute's Information Security Reading Room, May 18, 2001, URL: http://www.sans.org/infosecFAQ/firewall/taxonomy.htm, pp. 1-21.

Spitzner, Lance, "How Stateful is Stateful Inspection? Understanding the FW-1 State Table," http://www.enteract.com/~lspitz/fwtable.html, Nov. 29, 2000, pp. 1-8.

Sundaram, A., "An Introduction to Intrusion Detection," www.acm.org/crossroads/xrds2-4/intrus.html, Jan. 23, 2001, pp. 1-12.

Tyson, Jeff, "How Firewalls Work," http://www.howstuffworks.com/firewall.htm/printable, 2001, pp. 1-7.

Xinetica, Ltd., "An Overview of Intrusion Detection Systems," Xinetica White Paper, Nov. 12, 2001 (print date), URL: http://www.xinetica.com/tech_explained/general/ids/wp_ids.html, pp. 1-9.

Zuk, Nir, "Protect Yourself With Firewalls," www.techtv.com Jul. 12, 2001, URL:http://www.techtv.com/screensavers/print/0.23102.3325761.00.html, pp. 1-3.

Zuk, Nir, "How the Code Red Worm Works," www.techtv.com, Sep. 21, 2001, URL:http://www.techtv.com/screensaver/print/0.23102.3349133.00.html, pp. 1-2.

Petersen, S., et al., "Web apps pose security threat," ZDNet: Tech Update, Jan. 29, 2001, URL:http://techupdate.zdnet.com/techupdate/stories/main/0.14179.2679177.00.html, pp. 1-3.

Lancope, "StealthWatch Provides Early Detection of the Code Red Worm and its Future Variants," www.stealthwatch.com, date unknown, pp. 1-4, Jan. 25, 2006.

Reavis, J., "Cash and BURN," Jun. 2001, 6 pages.

SOS Corporation, "An Introduction to Firewalls," 1995, URL:http://www.uclan.ac.uk/facs/destech/compute/staff/haroun/FIREWALLS.HTM, pp. 1-3.

Morgan, Lisa, "Be Afraid, Be Very Afraid," InternetWeek Intrusion Detection Systems, Jan. 3, 2001, pp. 1-6.

Mullins, Robert, "'Cyber war' raises security concerns," *Silicon Valley/San Jose Business Journal*, May 11, 2001, pp. 1-4.

James P. Anderson Co., "Computer Security Threat Monitoring and Surveillance," Apr. 15, 1980, 56 pages.

Internet Security Systems, Inc., "REALSECURE™, The RealSecure Advantage," 2001, 2 pages.

Chuvakin, A., et al., "Basic Security Checklist for Home and Office Users," SecurityFocus, Nov. 5, 2001, pp. 1-5.

Network Ice, "SMTP WIZ command," 2001, URL:http://networkice.com/Advice/Intrusions/2001006/default.htm, pp. 1-2.

Bace, R., et al., "NIST Special Publication on Intrusion Detection Systems," National Institute of Standards and Technology Special Publication, date unknown, pp. 1-51, Jan. 25, 2006.

\* cited by examiner

PACKET PROCESSING IN A MULTIPLE PROCESSOR SYSTEM

RELATED APPLICATIONS

This application claims priority under 35 U.S.C. §119(e) based on U.S. Provisional Patent Application Ser. No. 60/704,432 filed Aug. 2, 2005 and is related to U.S. patent application Ser. No. 10/402,920, filed on Mar. 28, 2003, which are herein incorporated by reference in their entirety

FIELD OF THE INVENTION

The principles of the invention relate generally to network packet processing systems and, more particularly, to packet processing in multiple processor systems.

BACKGROUND

Network information can be split up into units of information called packets. Typically, the packets are routed dynamically between and within networks based on an efficient route between the source of the packet and the destination of the packet. Each packet typically contains a header that includes source and destination information for routing the packet and a data payload including typically a portion of the information being transmitted.

When a packet enters a network or system from an external source the packet can be examined. The examination may include determining where the packet should be routed, but also can include processing the packet to evaluate possible threats posed by the packet to the network. Different packet processing devices can be used to examine packets, for example, some packet processing devices target specific portions of a packet.

In a conventional network model, different packet processing devices can be designed to examine different layers within a packet. For example, a layered network model called the Open Systems Interconnect (OSI) model has been created by the International Standards Organization (ISO). The OSI model describes defined layers in a network operating system. Each layer has a defined input, output, and function. The OSI model defines a seven layer network and includes network and transport layers (layers 3 and 4, respectively) and an application layer (layer 7).

One type of packet processing device is a firewall. A firewall can be used to secure a network from users outside the network. The firewall checks, routes, and frequently labels all messages sent to or from users outside the network. Another packet processing device, such as an intrusion detection system, can be used to examine information being communicated with a network to recognize suspicious patterns of behavior. Information obtained by the intrusion detection system can be used to block unauthorized or disruptive users from accessing the network.

A flow-based router (FBR) allows network administrators to implement packet forwarding and routing according to network policies defined by a network administrator. FBRs allow network administrators to implement policies that selectively cause packets to be routed through specific paths in the network. FBRs can also be used to ensure that certain types of packets receive differentiated, preferential service as they are routed. Conventional routers can forward packets to their destination address based on available routing information. Instead of routing solely based on the destination address, FBRs enable a network administrator to implement routing policies to allow or deny packets based on several other criteria including the application, the protocol, the packet size and the identity of the end system.

A packet filter can operate on the packets in the network layer, to defend a trusted network from attack by an untrusted network. Packet filters can operate at the network layer to inspect fields of the Transmission Control Protocol/Internet Protocol (TCP/IP) header including, the protocol type, the source and destination Internet Protocol (IP) address, and the source and destination port numbers.

SUMMARY

The present specification describes systems and methods for providing packet processing in a multiple processor system.

In one aspect consistent with the principles of the invention, a packet processing system is provided. The system includes a first processor for processing a packet and for creating a tag associated with the packet. The tag includes information about the processing of the packet. The system includes a second processor to receive the packet subsequent to the first processor The second processor is configured to process the packet using the tag information.

In a second aspect consistent with the principles of the invention, a method for processing packets in a packet processing device is provided. The method includes receiving a packet at a packet processing device, directing the packet to a processor, processing the packet, creating a tag associated with the packet, where the tag includes information about the processing, forwarding the packet and the associated tag to a next processor in the packet processing device, and processing the packet at the next processor using the tag information.

In a third aspect consistent with the principles of the invention, the invention provides a packet processing system. The system includes a flow engine to route a packet among a group of processors. The system includes a first processor of the group of processors to process the packet and to create a tag to attach to the packet. The tag includes information about the processing of the packet by the first processor. The system includes a second processor of the group of processors to receive the packet from the flow engine and to process the packet including using the tag information.

In a fourth aspect consistent with the principles of the invention, a method for processing packets is provided. The method includes receiving a packet at a flow engine, routing the packet to a first processor, processing the packet at the first processor, creating and attaching a tag to the packet at the first processor, where the tag includes information about the processing useful to a next processor, transmitting the packet, including the tag, to the flow engine, routing the packet, including the tag, to the next processor, and processing the packet at the next processor using the tag information.

Implementations of the systems may include one or more of the following features. One processor of the system can be a firewall. One processor of the system can be an intrusion detection system. The tag can be appended or prepended to the packet. The tag includes data processed by the second processor. The tag information can include session information, flow information, instructions for inspection of the packet, an indication to drop the packet, or an indication to drop subsequent packets from a same session as the packet. Flows and sessions are described in U.S. patent application Ser. No. 10/072,683, filed Feb. 8, 2002, entitled "Multi-Method Gateway-Based Network Security Systems and Methods," the contents of which are incorporated herein by reference in its entirety.

The details of one or more embodiments of the invention are set forth in the accompanying drawings and the description below. Other features and advantages of the invention will become apparent from the description, the drawings, and the claims.

DESCRIPTION OF DRAWINGS

Like reference numbers and designations in the various drawings indicate like elements.

DETAILED DESCRIPTION

Figure 1:
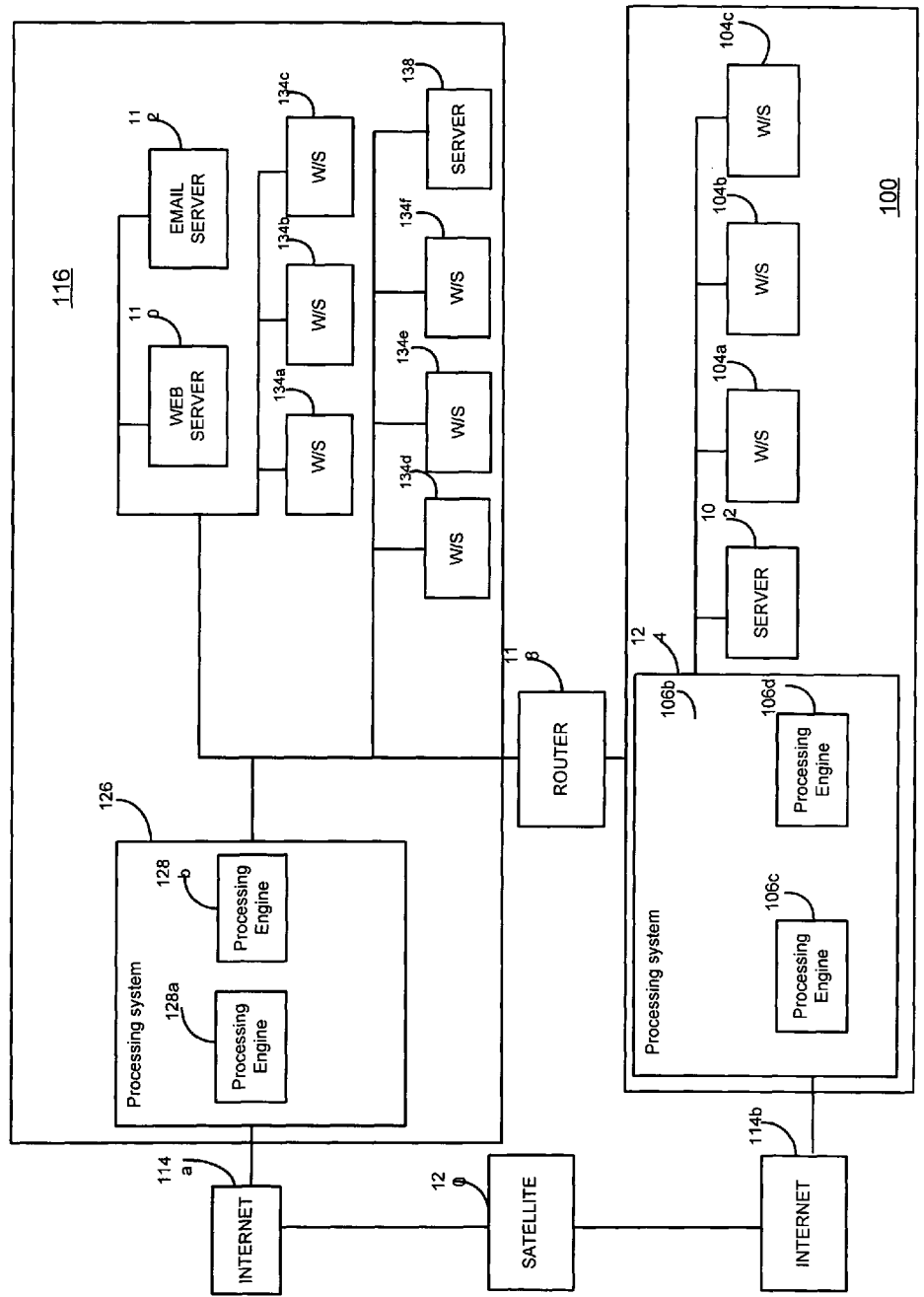
FIG. 1 shows an exemplary network topology including a processing system.

FIG. 1 illustrates a network topology including a local area network (LAN) 100, including a server 102, several workstations (W/S) 104a-104c (collectively, "104"), and a processing system 124. Processing system 124 may include a group of processing engines 106a-106d (collectively, "106") for processing packets. LAN 100 may be connected to an external network e.g., the Internet 114b, through processing system 124. LAN 100 may also be connected to a second LAN 116 through a router 118, and satellite 120. Second LAN 116 may include a web server 110, an email server 112, a server 102, several workstations 134a-113f (collectively, "134") and a processing system 126. LAN 116 may be connected to the Internet 114a via processing system 126. Processing system 126 may include processing engines 128a-128b (collectively, "128"). The computers, servers and other devices in the LAN may be interconnected using a number of data transmission media such as wire, fiber optics, and radio waves. Processing system 124 and processing system 126 may operate in a similar manner. Using processing system 124 by way of example, processing engines 106 may include a firewall processing engine, an intrusion detection system, a network address translation (NAT) engine and other processing engines. Processing engines 106 can act in conjunction with each other to facilitate the efficient processing of packets at different network levels. For example, a firewall processing engine can examine packet information at network layer 3 and layer 4 levels while an intrusion detection engine can look at a different network layer in the packet, such as network layer 7 information. The firewall processing engine may provide information regarding results of the firewall's processing to the intrusion detection engine in order to facilitate processing by the intrusion detection engine. The communication between processing engines is discussed in greater detail below.

Figure 2A:
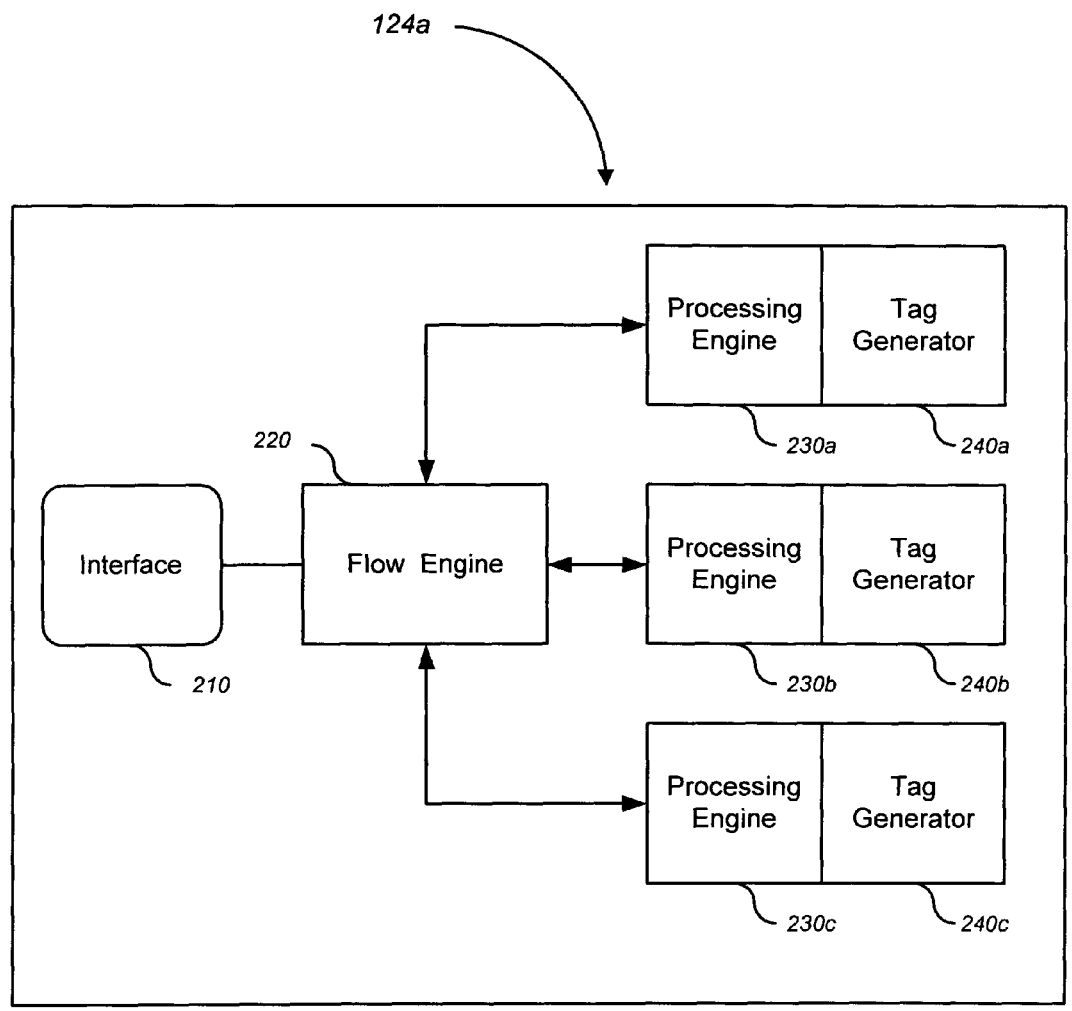
FIG. 2a illustrates a block diagram of an exemplary processing system including multiple tag generators.

FIG. 2a illustrates an implementation of a processing system, such as processing system 124a. Processing system 124a may include a packet interface 210 for receiving packets, a flow engine 220, such as a flow-based router, a group of processing engines 230a-230c (collectively, "230"), and a group of tag generators 240a-240c (collectively, "240"). Packet interface 210 may transmit received packets to flow engine 220, which may route the packets to processing engines 230. Processing engines 230 may process individual packets based on some predetermined criteria. For example, processing engine 230 can be a firewall processing engine that examines packets at network layer 3 and layer 4. Processing engines 230 may be coupled to tag generators 240. Tag generators 240 can be used to attach tags to packets following processing by processing engines 230. Tag generators 240 can replace existing tags attached to packets with new tags. Tag generators 240 can also attach new tags to packets without altering or removing an existing tag or tags. Packets can thus have multiple attached tags. Alternatively, tag generators 240 can be used to modify an existing tag attached to packets. The tag content is described in further detail with respect to FIG. 4 below. Three processing engines 230a, 230b, and 230c are illustrated in FIG. 2a coupled parallel to each other through the flow engine 220. Any number of processing engines 230 can, however, be included in the processing system 124a.

Figure 2B:
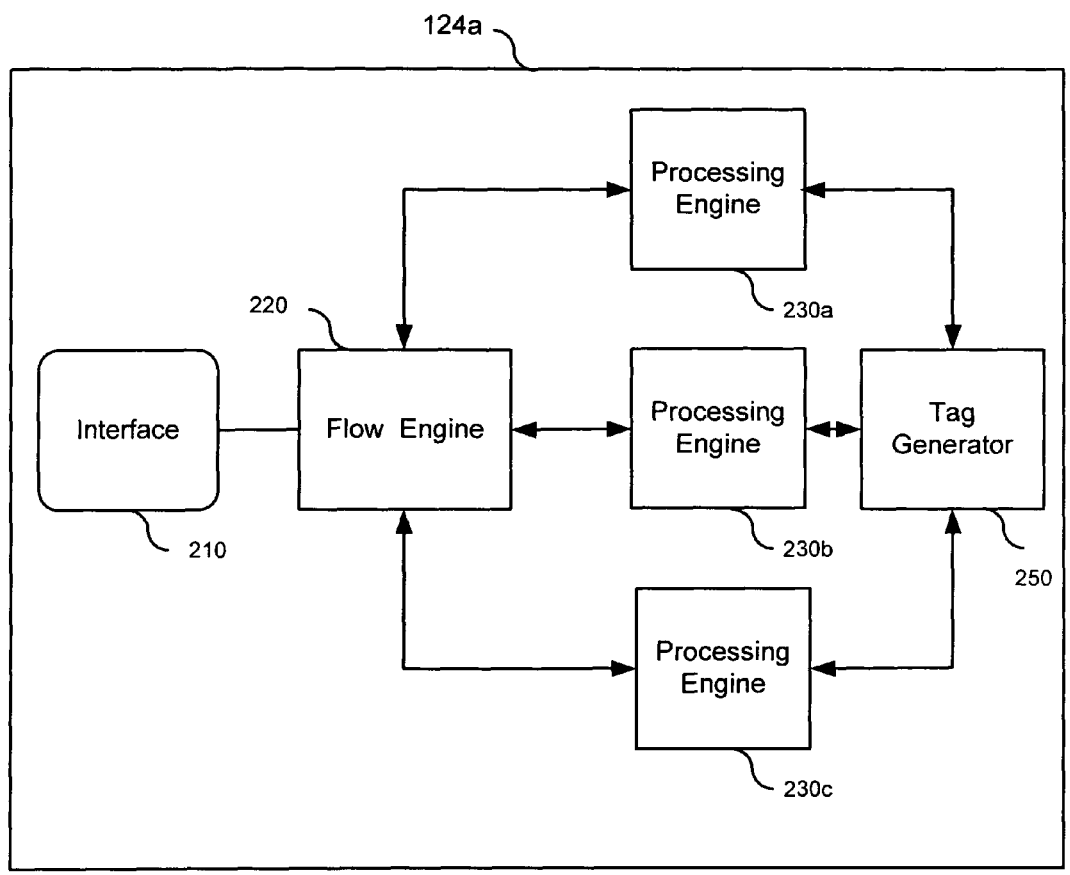
FIG. 2b illustrates a block diagram of an alternative processing system including a single tag generator.

FIG. 2b illustrates an alternative implementation of processing system 124a. Processing system 124a may include packet interface 210 for receiving packets, flow engine 220, such as a flow-based router, a plurality of processing engines 230a-230c (collectively, "230"), and a shared tag generator 250. Packet interface 210 may transmit received packets to flow engine 220, which may route the packets to processing engines 230. Processing engines 230 may process individual packets based on some predetermined criteria. For example, processing engine 230 can be a firewall processing engine that examines packets at the network layer 3 and layer 4. Processing engines 230 may be coupled to shared tag generator 250. Shared tag generator 250 can be used to attach tags to packets following processing by processing engines 230. Attached tags can replace existing tags or tags can be attached without modifying any existing tags. Alternatively, shared tag generator 250 can be used to modify an existing tag attached to packets. In one implementation, all processing engines 230 share one tag generator. In another implementation, a subset of processing engines 230 share one of a group of shared tag generators.

Figure 3A:
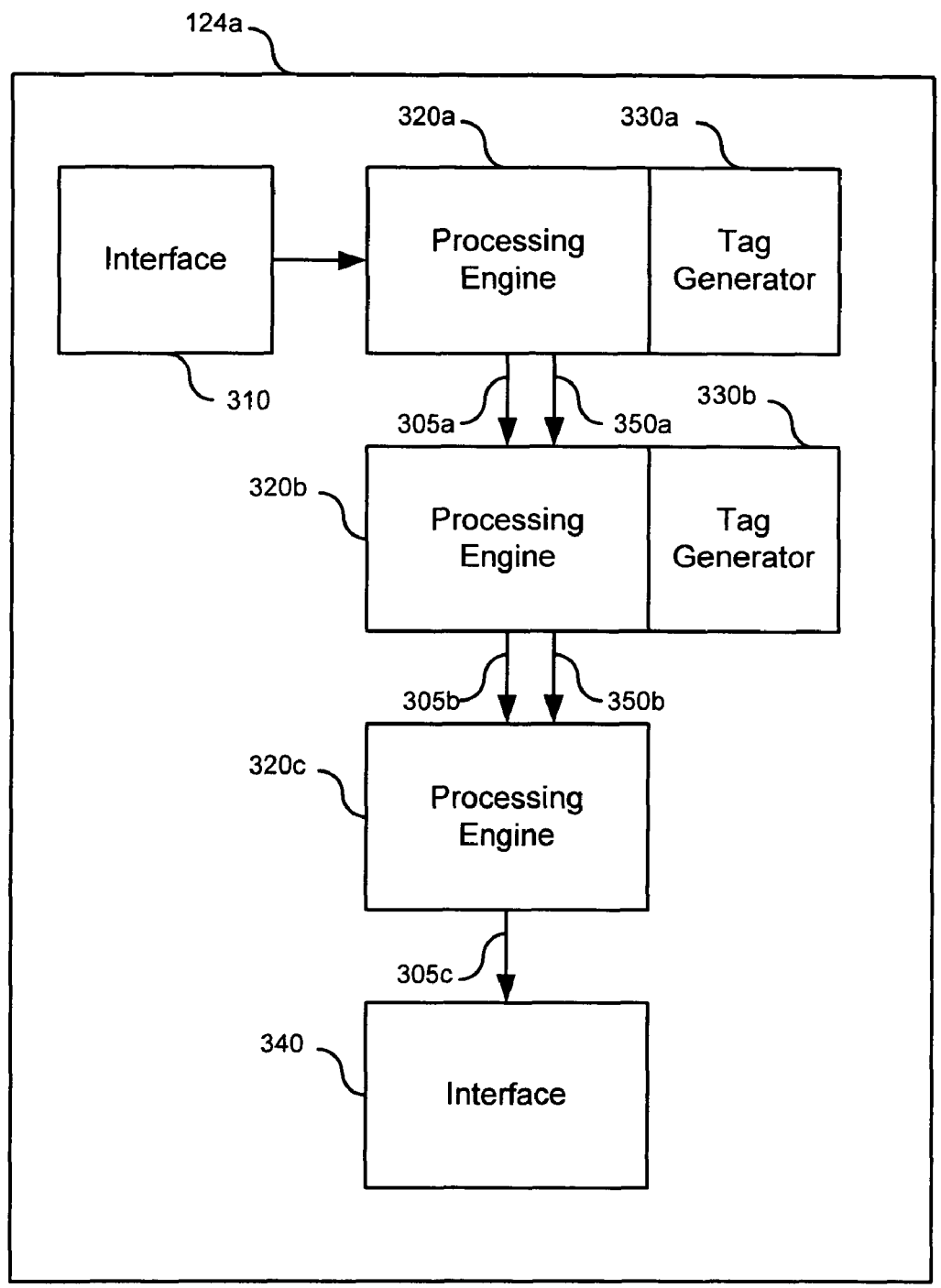
FIG. 3a illustrates a block diagram of an alternative processing system including serial processors.

FIG. 3a illustrates an alternative implementation of processing system 124a. Processing system 124a may include an incoming packet interface 310 for receiving packets into processing system 124. Received packets may pass though interface 310 to first serial processing engine 320a. First serial processing engine 320a may be coupled to a first tag generator 330a for attaching tags to packets after processing. First serial processing engine 320a may be coupled serially to second serial processing engine 320b. Second serial processing engine 320b may be coupled to second tag generator 330b. Additional serial processing engines can be coupled in series from second serial processing engine 320b. Additional tag generators can be coupled to each additional serial processing engine. Tag generators 330a and 330b (collectively, "330") can generate a new tag or can modify an existing tag. New or modified tags can replace existing tags or can be attached without replacing existing tags. Tags may be sent over paths 350a and 350b (collectively, "350") and packets may be sent over paths 305a and 305b (collectively, "305"). Alternatively, packets and tags may be sent over a common path. FIG. 3a illustrates processing system 124a having three serial processing engines 320a. Any number of processing engines 320, however, can be included in processing system 124a. Interface 340 may be coupled to a last serial processing engine, in this case third serial processing engine 320c, through which packets exit processing system 124a.

Figure 3B:
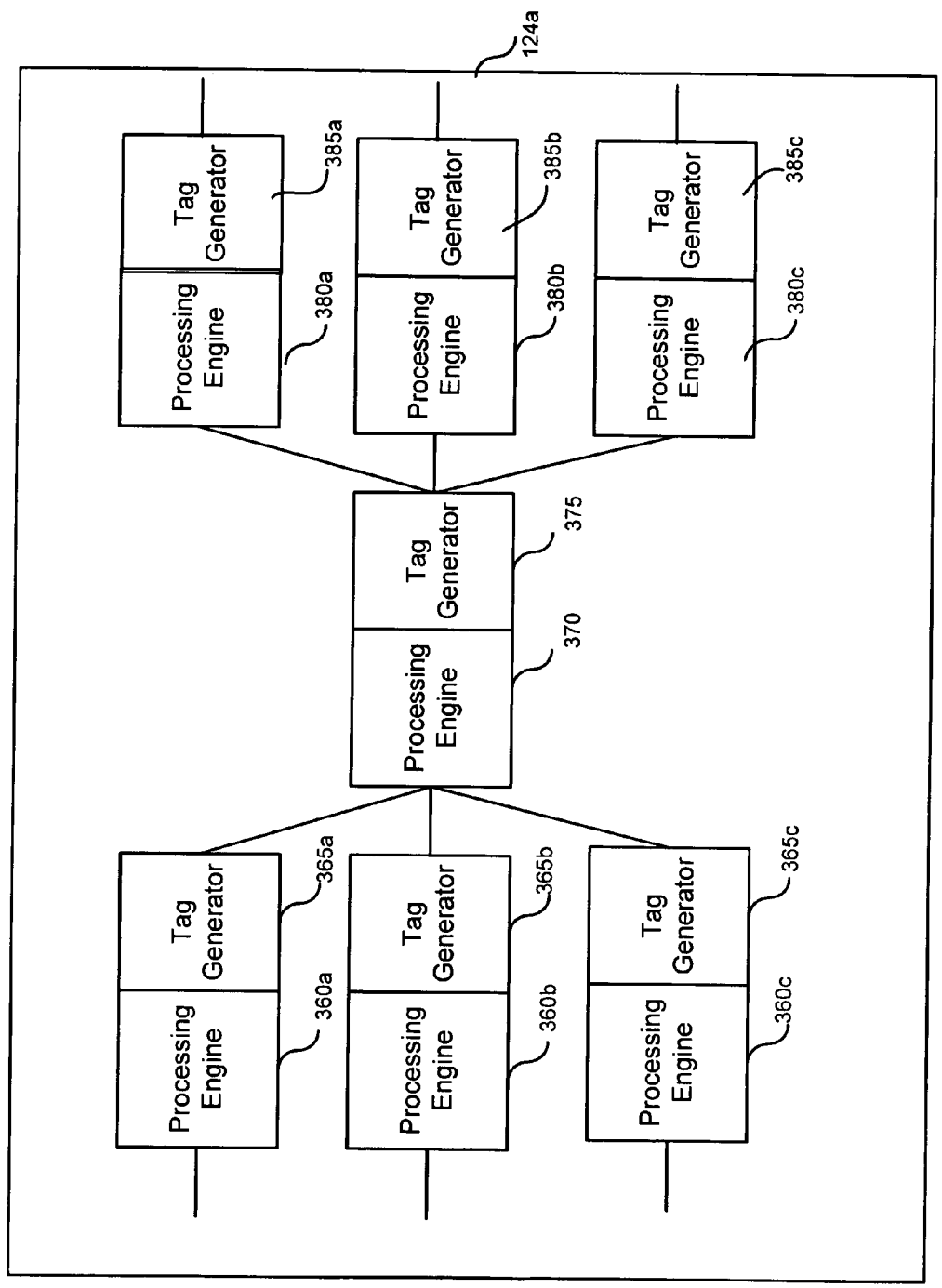
FIG. 3b illustrates a block diagram of an alternative processing system.

Other packet processing architectures can be implemented, such as processing system 124a illustrated in FIG. 3b. FIG. 3b shows an alternative arrangement of processing engines and tag generators. Processing engine 370 can receive a packet from processing engines 360a-360c (collectively, "360") and tag generators 365a-365b (collectively, "365"). Each of the processing engines 360 may receive packets from a source, such as an interface or another processing engine (not shown). Processing engines 360 may then process packets and tag generators 365 may attach a tag to each of the packets. The packets may then be transmitted to processing engine 370. Processing engine 370 is coupled to tag generator 375 for creating a new tag or for modifying an existing tag after processing by processing engine 370. New or modified tags can be attached to a packet without impacting an existing tag, or a new or modified tag can replace an existing tag. After processing by processing engine 370, packets can be transmitted to one or more additional processing engines 380a-380c (collectively, "380"). Processing engines 380 may be coupled to tag generators 385a-385c (collectively, "385") for attaching a tag to the packets. The packets may then be transmitted to other devices, such as processing engines for further processing of the packet or an interface for transmission outside of processing system 124a.

Figure 4:
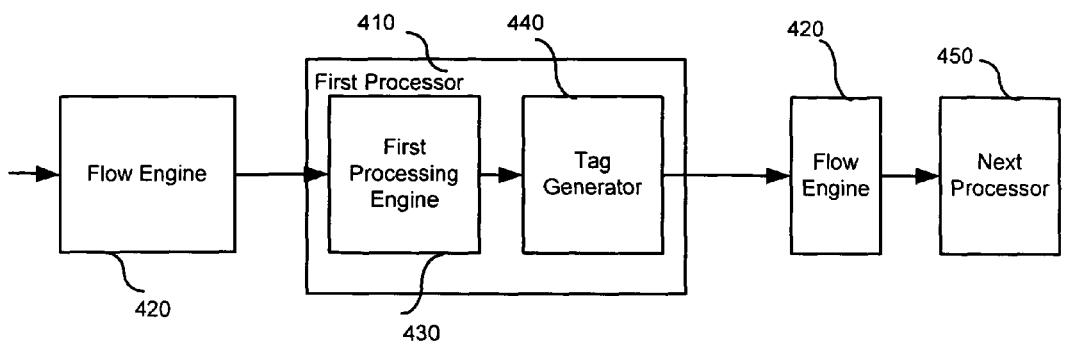
FIG. 4 illustrates an exemplary packet processing engine and a tag generator.
Figure 5:
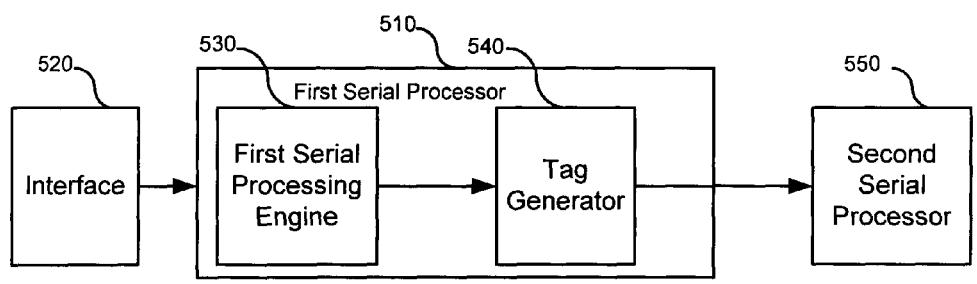
FIG. 5 illustrates a second exemplary packet processing engine and a tag generator.

FIG. 4 illustrates a portion of the path of packet 460 in processing system 124 as illustrated in FIG. 2a. FIG. 5 illustrates a portion of the path of a packet in processing system 124 as illustrated in FIG. 3a. Referring now to FIG. 4, packet 460 is routed by a flow engine 420 from an interface (not shown) to a first processor 410. First processor 410 may include a processing engine 430 and a tag generator 440. After processing, processing engine 430 may transmit a packet, which may include a header and a data payload, to tag generator 440. Tag generator 440 may attach a tag to the packet and may transmit the packet/tag combination back to flow engine 420 for routing to a next processor 450.

Tag generator 440 may generate tags based on the results of the processing by first processing engine 430. The tags can include information useful to next processor 450 in processing the associated packet. Additionally, tags can include information or instructions for flow engine 420. Tags can include information from all prior processing steps. or can include only the processing of the immediately preceding processing engine. The tag information can include, but is not limited to, some or all of the following: network layer 3 and layer 4 data, a context pointer, a cookie, a next processing context, and a communication action flag. In a network having a seven layer model, network layer 3 and layer 4 information includes information such as source IP address, destination IP address, protocol, port numbers, TCP states, running sequence numbers, and retries. The context pointer provides context information for the packet that can be useful for the next processing engine. For example, the context pointer can include session information for the packet. The session information informs the processing engine of the session the packet belongs to, can provide for consistent treatment of all packets within a particular session, and provide for expedited processing of subsequent packets belonging to a same session.

A cookie can be included that provides a composite of system-related information for the processing of a specific packet. For example, a packet subject to special inspection, resulting from a user policy configuration, can include a cookie with information about the special inspection required for use by the subsequent processing engines. The next processing context information can instruct a subsequent processing engine on actions to take following processing of the packet. The tag can also include information on which processing engine should process the packet next or can include instructions for a subsequent processing engine. For example, a firewall processing engine can attach a tag following processing that directs the intrusion detection engine to transmit the packet to a particular processing engine following processing by the intrusion detection engine. In a further example, the intrusion detection engine can be instructed to transmit the packet next to a Virtual Private Network (VPN) processing engine for encryption following intrusion detection. In one implementation, the next processing context may include both a processing engine ID, identifying the desired processing engine the instructions are directed to, as well as context information for the processing engine. The context information being provided to a VPN processing engine can include, for example, a security association for the packet. A security association can include, for example, the unique encryption keys for a session so that the VPN processing engine knows which encryption key to use on the packet and all packets in the same session.

The communication action flag can be generated to provide communication between different processing engines and between processing engines and a flow engine. For example, a communication action flag attached to a packet by a processing engine can inform the flow engine not to route any more packets from the same session to any processing engines. For example, if the intrusion detection engine determines that a packet is part of an attack, the intrusion detection engine can attach a tag to the packet instructing the flow engine to drop all incoming packets from the session upon receipt. The communication action flag can also include an indication for a processing engine or a flow engine to otherwise process the packet. Otherwise processing can include dropping, logging, alarming, and holding the packet.

Referring now to FIG. 5, a packet may be routed by an interface 520 to a first serial processor 510. First serial processor 510 may include a first serial processing engine 530 and a tag generator 540. The packet may include a header and a data payload, and may be transmitted from first serial processing engine 530 to tag generator 540. Tag generator 540 may attach a tag to the packet and may transmit a packet/tag combination to a second serial processor 550. Tag generator 540 may generate the tag based on the results of the processing by first serial processing engine 530. The tag can include information useful to second serial processor 550 in processing the packet. The tag information can include, but is not limited to, some or all of the following: network layer 3 and layer 4 data, a context pointer, a cookie, a next processing context, and a communication action flag. The content and use of the tag attached to the packet may be similar to the tag content and use described above with respect to FIG. 4.

Figure 6:
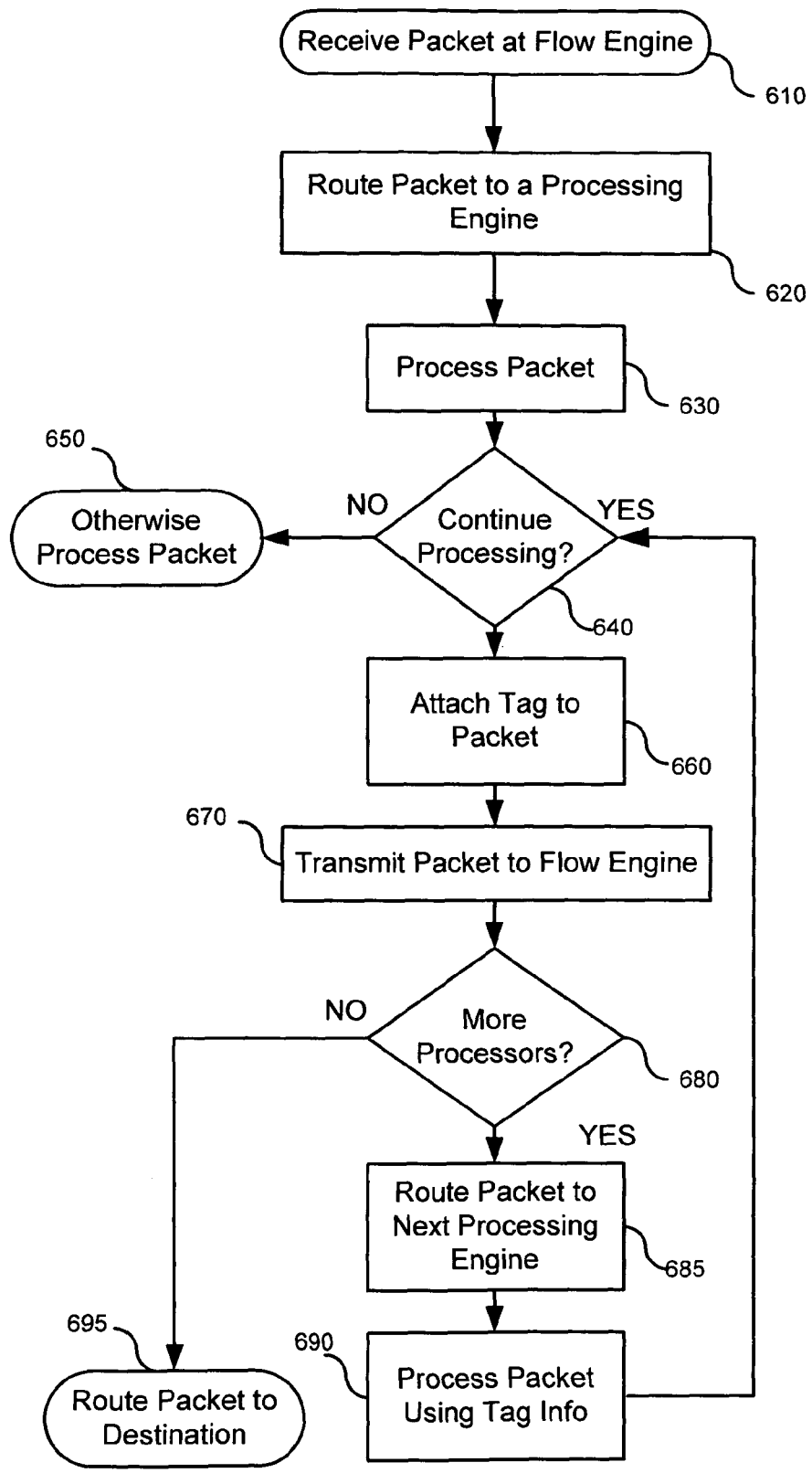
FIG. 6 is a flowchart describing the operation of an exemplary processing system including a flow engine.

FIG. 6 provides a flowchart illustrating operations performed by processing system 124a of FIG. 2a. A packet is received by flow engine 220 from interface 210 (step 610). Flow engine 220 may route the received packet to first of processing engines 230 (step 620). The processing engine processes the packet (step 630). Processing can take numerous different forms depending on the type of processing engine. For example, a processing engine performing firewall processes can examine layer 3 and layer 4 information within a packet to search for a network attack.

After processing the packet, a determination may be made as to whether or not to continue processing the packet (step 640). For example, if the processing engine is a firewall, processing can determine that the packet is part of an attack. As a result, the processing engine can otherwise process (e.g., drop, log, alarm, or hold) the packet (step 650). If the processing is to continue, a tag may be attached to the packet by the tag generator associated with the processing engine (step 660). For example, if the packet is suspected of an attack based on the analysis by a firewall processing engine, the tag can include instructions for a subsequent one of processing engines 230 (for example, an intrusion detection engine) to make a careful investigation of the packet to determine whether or not the packet is an attack, and to drop the packet if it is an attack. In an alternative implementation, instead of dropping the attack packet, a tag may be attached to the packet that includes a communication action flag for flow engine 220. The communication action flag may instruct flow engine 220 to drop the packet and any received packets matching the session of the packet. Conversely, if the packet is determined by the firewall processing engine to be a packet that is not suspect, the tag can include information informing the intrusion detection engine that no detailed investigation is necessary. The tag can also include instructions for one of processing engines 230 or flow engine 220 to "otherwise process" the packet. "Otherwise processing" the packet can include, for example, dropping, logging, alarming, holding, and alerting, each of which may result in the content of the packet being modified.

The packet with the attached tag may be transmitted back to flow engine 220 for routing to subsequent processing engine 230 (step 670), as shown in FIG. 4. Flow engine 220 may then determine if more processing engines 230 are used to process the packet prior to routing the packet to a destination outside processing system 124a (step 680). Flow engine 220 can use information in the tag to determine what further processing is required. If no other processing engines 230 are to process the packet, flow engine 220 may route the packet through interface 210 to the destination (step 695). If other processing engines 230 are to process the packet, flow engine 220 may route the packet to the next of processing engines 230 to process the packet (step 685). Additionally, flow engine 220 can receive instructions within the tag from one of processing engines 230. For example, if the firewall processing engine determines that a packet is part of an attack, a tag including a communication action flag can be sent to flow engine 220 informing flow engine 220 not to route any more packets from the same session as the packet.

A next one of processing engines 230 may then process the packet using information obtained from the attached tag (step 690). The next one of processing engine 230 may examine the tag for information based on previous processing of the packet. The tag can provide information leading to expedited or more intensive processing by the next one of processing engines 230. For example, the tag can provide information indicating that a previous one of processing engines 230 determined that the packet was possibly part of an attack and requires detailed examination by a next one of processing engines 230. Alternatively, the tag can provide information indicating that a previous one of processing engines 230 determined that the packet was not a threat and does not require detailed examination by a subsequent one of processing engines 230.

After processing, flow may return to step 640 to determine if processing of the packet should continue. For example, the packet can be cleared by the firewall processing engine only to be recognized by the intrusion detection engine as part of an attack. Upon discovery of the attack, the intrusion detection engine can determine that no further packets from the attack session should be processed. If the processing is terminated, the packet can be otherwise processed, for example by dropping the packet (step 650). If the processing is allowed to continue, a new tag may be attached to the packet reflecting the processing (step 660). The new tag can be attached to the packet by a tag generator for a particular one of processing engines 230, or the new tag can be attached to the packet by a shared tag generator 250 (FIG. 2b). Alternatively, new data may be attached to the old tag instead of attaching a new tag to the packet.

In another implementation, a packet to be dropped can have a tag attached including instructions to flow engine 220 not to route any further packets from the session of the packet. The process from step 640 to step 690 may be repeated for each of processing engines 230 until no other processing engines 230 are to process the packet. For example, flow engine 220 can determine, based on prior processing steps and tag information, if further processing is required. When no other processing engines 230 are to process the packet, flow engine 220 may route the packet to the destination (step 695). In one implementation, the tag may be discarded by flow engine 230 before routing the packet outside processing system 124a.

Figure 7:
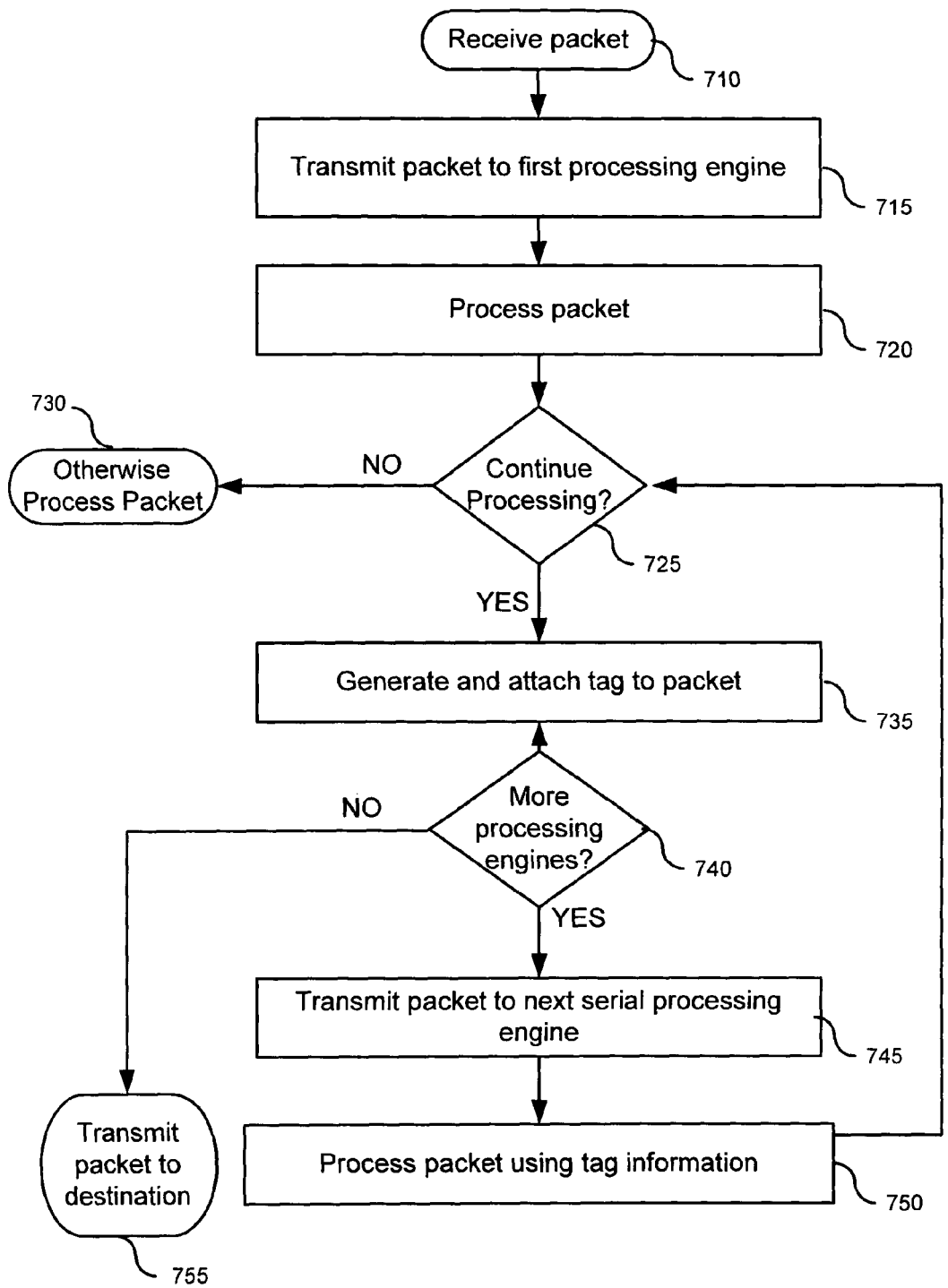
FIG. 7 is a flowchart describing the operation of an exemplary processing system including serial processors.

FIG. 7 shows a flowchart illustrating processing system 124a of FIG. 3a. Processing system 124a may receive a packet at interface 310 (step 710). Interface 310 may transmit the packet to first serial processing engine 320a (step 715). First serial processing engine 320a may process the packet (step 720). As described above with respect to FIG. 6, processing can include examination of different network layers within the packet. First serial processing engine 320a can be a firewall as discussed above with respect to FIG. 6, or some other processing engine. After processing, first serial processing engine 320a may determine if the packet should be transmitted to a next one of serial processing engines 320 (e.g., second serial processing engine 320b) for further processing (step 725).

If first serial processing engine 320a determines that the packet should not be processed further, the packet may be otherwise processed (step 730). If first serial processing engine 320a determines that the packet can continue processing, a tag may be attached to the packet by tag generator 330 (step 735). If there are more serial processing engines 320 (step 740) then the packet may be transmitted to next of serial processing engines 320 (e.g., second serial processing engine 320b) (step 745). The next one of serial processing engines 320 may then process the packet using the tag information contained in the tag (step 750). After the next one of serial processing engines 320 processes the packet using the tag information, the flow may return to step 725 for a determination of whether or not to continue processing the packet. If the packet is not to be processed further, the packet may be otherwise processed (step 730). If the processing is to continue, a new tag may be attached to the packet by one of tag generators 330 (step 735). In an alternative implementation, new data may be attached to an existing tag. The tag information can include information from all prior processing steps or can include only the processing of the immediately preceding one of processing engines 320. The tag can also include instructions for processing engines 320 to otherwise process the packet. Otherwise processing the packet can include dropping, logging, alarming, and holding. The tag information can include the same information as described above with respect to FIG. 4.

The flow from step 725 to step 750 continues for each subsequent one of serial processing engines 320 (e.g., third serial processing engine 320c) until no further serial processing engines 320 remain to process the packet. The last of serial processing engines 320 (e.g., third serial processing engine 320c in FIG. 3) may transmit the packet to the destination as defined, for example, by the destination IP address of the packet (step 755). In one implementation, a tag may be removed by last serial processing engine 320 before transmission of the packet to interface 340. In another implementation, the tag may be removed by interface 340 prior to transmission of the packet to the destination.

Figure 8:
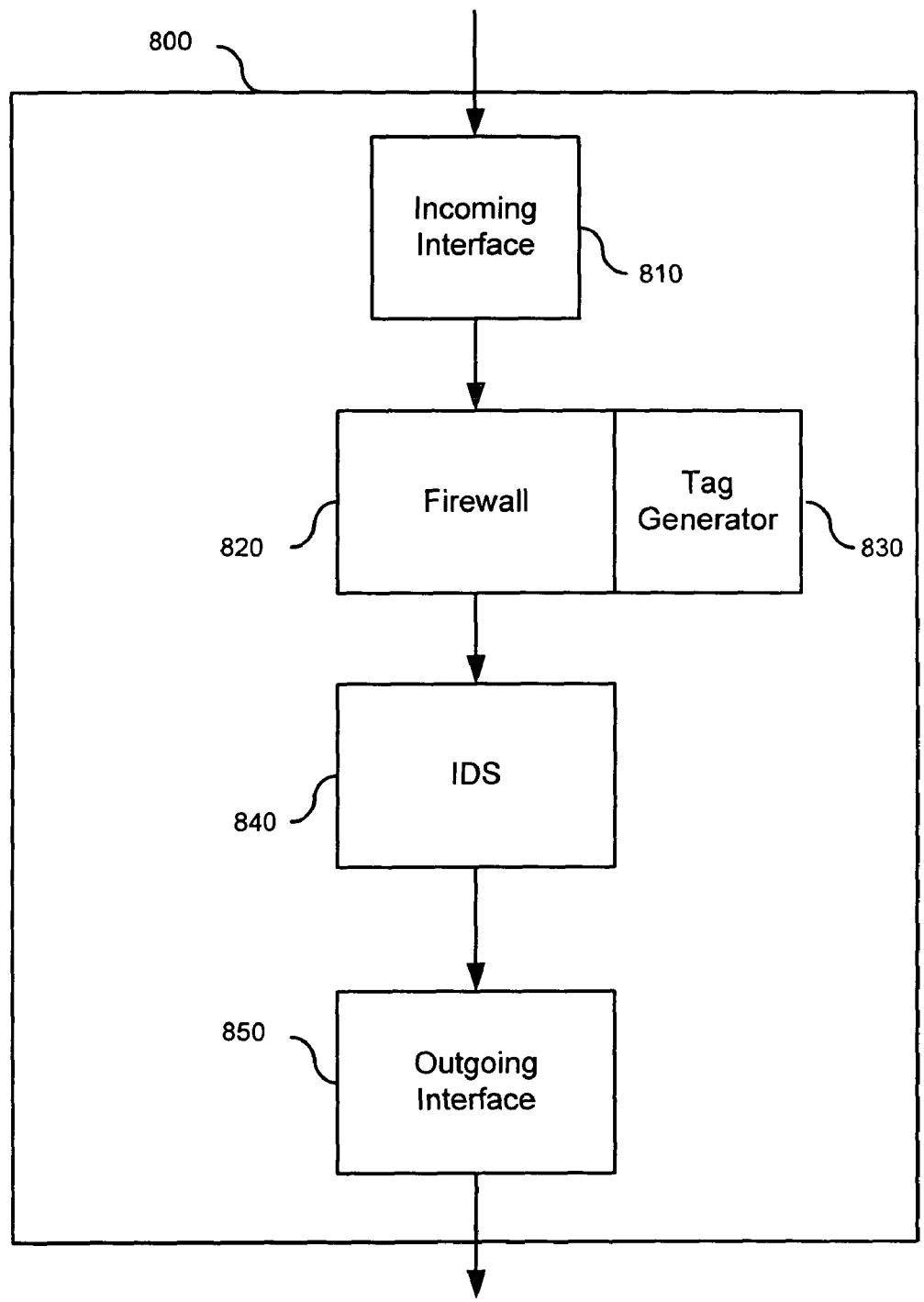
FIG. 8 illustrates a block diagram of an exemplary processing system including a firewall and an intrusion detection system.

FIG. 8 illustrates a processing system 800 that may include an incoming interface 810 that receives a packet from an external source, such as an external network. Incoming interface 810 may route the packet to a firewall 820 for processing. Firewall 820 includes a tag generator 830 for attaching a tag to a packet. A packet/tag combination can be transmitted from firewall 820 to an IDS 840 for further processing. After processing, the packet can be transmitted to an outgoing interface 850. Outgoing interface 850 may then route the packet out of processing system 800 to the packet's destination.

Figure 9:
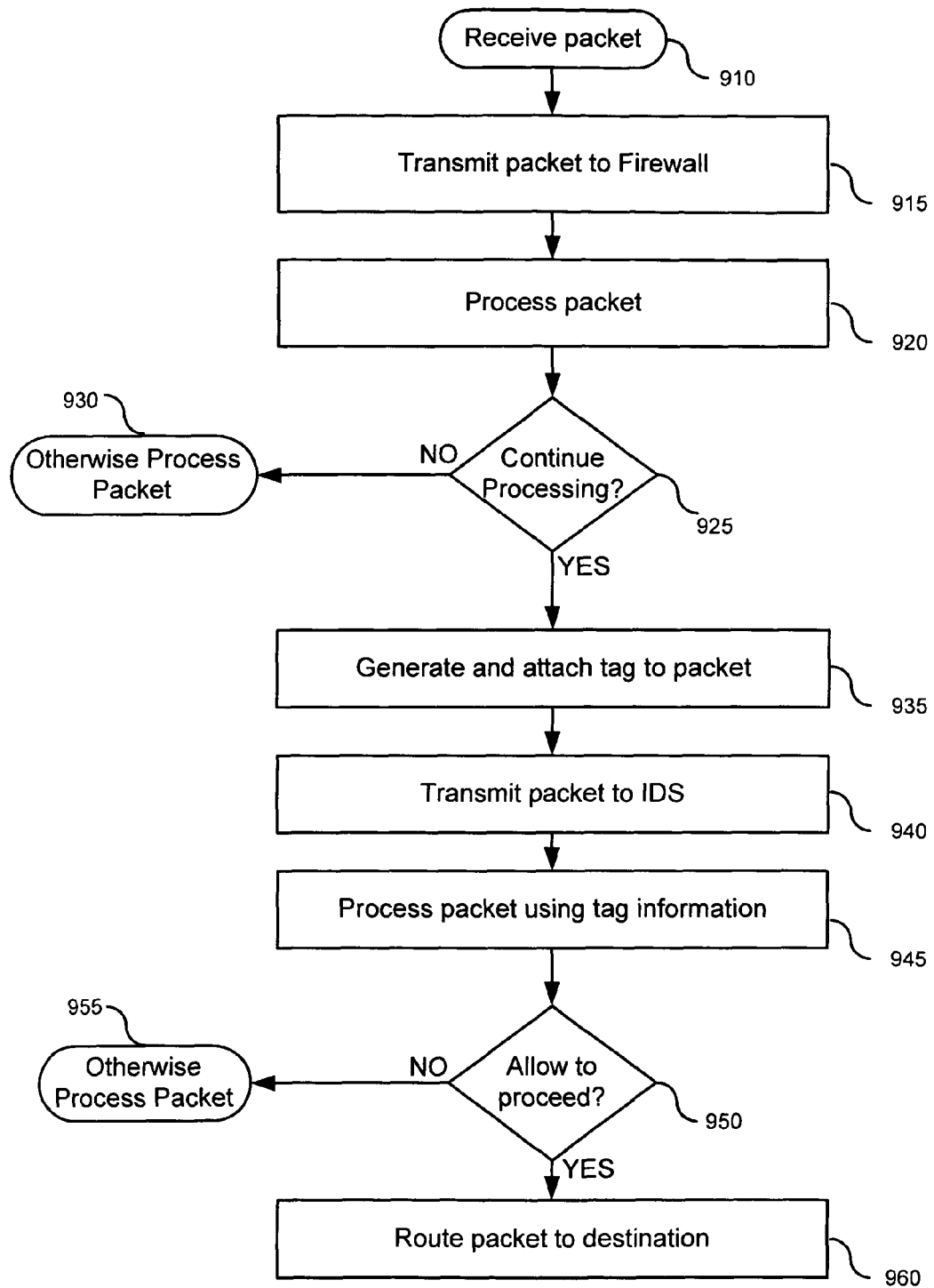
FIG. 9 is a flowchart describing the operation of an exemplary processing system including a firewall and an intrusion detection system.

FIG. 9 shows a flowchart illustrating exemplary processing of processing system 800 of FIG. 8. Processing system 800 may receive a packet at interface 810 (step 910). Interface 810 may transmit the packet to firewall 820 (step 915). Firewall 820 may process the packet (step 920). The processing by firewall 820 may include examination of the packet at network layer 3 and layer 4. Processing by firewall 820 may also include performing a session look-up on the packet in order to determine to which session the packet belongs. Based on the examination, firewall 820 may determine whether to transmit the packet to the next processor (step 925). If examination by firewall 820 reveals that the packet is a threat, the packet can be otherwise processed (e.g., dropped) (step 930). If the packet is allowed to proceed, tag generator 830 may generate and attach a tag to the packet (step 935). The tag may include session ID information for the packet as determined by firewall 820. The tag can also include log information for the packet.

The firewall may then transmit a packet/tag combination to IDS 840 for processing (step 940). IDS 840 may use the session ID contained within the tag so that the IDS does not have to perform a session look-up on the packet. As a result, IDS 840 can apply policies on how to process the packet based on the session ID without performing a session lookup (step 945). After processing, IDS 840 may determine whether or not the packet is allowed to proceed out of processing system 800 (step 950). If, based on the processing, the packet is not allowed to proceed, the packet can be otherwise processed (e.g., dropped) (step 955). If the packet is allowed to proceed, the tag may be removed and the packet may be routed through interface 850 to the packet's destination (step 960).

Tags can be appended or prepended to the packet. A new tag can be generated with each processing or the tag can have new data appended or prepended to the existing tag. The tag can include instructions as well as data to be processed by the processing engines or by the flow engines.

In one implementation, a tag generator can be used to attach a tag prior to a determination of continued processing. A tag can be automatically generated following processing by a processing engine and then a determination can be made as to whether or not the processing should continue, or the packet with tag can be forwarded to another device for a determination of continued processing. In another implementation, the processing engines may include a tag analyzer for analyzing the tag information in order to determine what level of processing is required for the packet.

In one implementation, each tag generator and processing engine pair can be integrated on one printed circuit board ("PCB") or alternatively on one integrated circuit ("IC"). In another implementation, multiple pairs of processors and tag generators can be integrated on one PCB or on one IC. In a further implementation, a plurality of processing engines can share the same tag generator. Additionally, in an implementation including a flow engine, the flow engine can be integrated with a plurality of processing engines on one PCB or on one IC. Further, the flow engine can be integrated with a plurality of processing engines and at least one tag generator on one PCB or one IC.

The invention and all of the functional operations described herein can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations of the invention have been described. Nevertheless, it will be understood that various modifications may be made without departing from the spirit and scope of the invention. Accordingly, other implementations are within the scope of the following claims.

What is claimed is:

1. A packet processing system, comprising:
a packet interface to receive a packet;
a flow engine, connected to the packet interface, to route the packet to a first processing engine;
the first processing engine, connected to the flow engine, comprising a firewall processing engine, an intrusion detection system, or a network address translation (NAT) engine, to:
receive the packet from the flow engine,
process the packet,
create a tag associated with the packet, where the tag includes:
information about the processing of the packet, and
an indication to drop other packets subsequently received at the packet processing system from a same session as the packet, and
transmit the packet to the flow engine;
where the flow engine is further to:
receive the packet from the first processing engine, and
route the packet to a second processing engine;
the second processing engine, connected to the flow engine, comprising a firewall processing engine, an intrusion detection system, or a network address translation (NAT) engine, to:
receive the packet from the flow engine, and
process the packet using the tag information, where the first processing engine is different than the second processing engine.

2. The packet processing system of claim 1, where the tag is appended to the packet.

3. The packet processing system of claim 1, where the tag is prepended to the packet.

4. The packet processing system of claim 1, where the tag includes data processed by the second processing engine.

5. The packet processing system of claim 1, where the tag information includes at least one of session information, flow information, or inspection instructions.

6. The packet processing system of claim 1, where the second processing engine is further to create a new tag associated with the packet, the tag including information about the processing of the packet.

7. The packet processing system of claim 1, where the second processing engine is further to add new data to an existing tag.

8. The packet processing system of claim 1, where each of the first and second processing engines includes a tag generator to create tags.

9. The packet processing system of claim 1, where the first and second processing engines are to share a tag generator to create tags.

10. The packet processing system of claim 1, where the first and second processing engines and at least one tag generator are integrated on one printed circuit board.

11. The packet processing system of claim 1, where the first and second processing engines and at least one tag generator are integrated on one integrated circuit.

12. The packet processing system of claim 1, where the first and second processing engines are included on one printed circuit board.

13. The packet processing system of claim 1, where the first and second processing engines are included on one integrated circuit.

14. A method, comprising:
receiving, via a packet interface, a packet;
routing, via a flow engine, connected to the packet interface, the packet to a first processing engine,
where the first processing engine connected to the flow engine, comprises at least one of a firewall processing engine, an intrusion detection system, or a network address translation (NAT) engine;
receiving, via the first processing engine, the packet from the flow engine;
processing, via the first processing engine, the packet received from the flow engine to create a processed packet;
associating, via the first processing engine, a tag with the processed packet,
where the tag includes information about the processing of the packet and an indication to drop other packets subsequently received at a packet processing system from a same session as the packet;
transmitting, via the first processing engine, the processed packet, with the associated tag, to the flow engine;
receiving, via the flow engine, the processed packet, with the associated tag, from the first processing engine;
routing, via the flow engine, the processed packet, with the associated tag, from the first processing engine, to a second processing engine,
where the second processing engine, connected to the flow engine, comprises a firewall processing engine, an intrusion detection system, or a network address translation (NAT) engine;
receiving, via the second processing engine, the processed packet, with the associated tag, from the flow engine; and
processing, via the second processing engine, the processed packet, with the associated tag, using the tag,
where the first processing engine is different than the second processing engine.

15. The method of claim 14, where the tag is appended to the packet.

16. The method of claim 14, where the tag is prepended to the packet.

17. The method of claim 14, where the tag includes data processed by the second processing engine.

18. The method of claim 14, where the tag includes at least one of session information, flow information, or inspection instructions.

19. The method of claim 14, further comprising:
creating, via the second processing engine, a new tag associated with the processed packet, the new tag including information about the processing of the packet.

20. The method of claim 14, further comprising:
adding, via the second processing engine, new data to the tag.

21. The method of claim 14, where at least one of the first or second processing engines includes a tag generator to create tags.

22. The method of claim 14, where the first and second processing engines share a tag generator to create tags.

23. The method of claim 14, where the first and second processing engines and at least one tag generator are integrated on one printed circuit board.

24. The method of claim 14, where the first and second processing engines and at least one tag generator are integrated on one integrated circuit.

25. The method of claim 14, where the first and second processing engines are included on one printed circuit board.

26. The method of claim 14, where the first and second processing engines are included on one integrated circuit.

* * * * *